United States Patent
Choung et al.

(10) Patent No.: US 11,514,316 B2
(45) Date of Patent: Nov. 29, 2022

(54) METHOD AND APPARATUS FOR INSPECTING DEFECTS IN WASHER BASED ON DEEP LEARNING

(71) Applicant: LG ELECTRONICS INC., Seoul (KR)

(72) Inventors: Dongsoo Choung, Seoul (KR); Guntae Bae, Seoul (KR)

(73) Assignee: LG Electronics Inc., Seoul (KR)

(*) Notice: Subject to any disclaimer, the term of this patent is extended or adjusted under 35 U.S.C. 154(b) by 326 days.

(21) Appl. No.: 16/824,983

(22) Filed: Mar. 20, 2020

(65) Prior Publication Data
US 2021/0042618 A1 Feb. 11, 2021

(30) Foreign Application Priority Data
Aug. 9, 2019 (KR) .................. 10-2019-0097384

(51) Int. Cl.
| | |
|---|---|
| *G01M 99/00* | (2011.01) |
| *G06N 3/08* | (2006.01) |
| *G06N 3/04* | (2006.01) |
| *H04W 84/04* | (2009.01) |
| *G06Q 10/00* | (2012.01) |

(52) U.S. Cl.
CPC ............ *G06N 3/08* (2013.01); *G01M 99/005* (2013.01); *G06N 3/04* (2013.01); *G06N 3/0454* (2013.01); *G06Q 10/20* (2013.01); *H04W 84/042* (2013.01)

(58) Field of Classification Search
USPC .......................................................... 706/20
See application file for complete search history.

(56) References Cited

U.S. PATENT DOCUMENTS

| | | | |
|---|---|---|---|
| 2019/0041811 A1* | 2/2019 | Drees ................ | G06K 9/00496 |
| 2020/0104704 A1* | 4/2020 | Venkataramani ........ | G06N 3/08 |
| 2022/0128388 A1* | 4/2022 | Raduchel ............... | G01F 1/696 |

* cited by examiner

*Primary Examiner* — Paul D Lee
(74) *Attorney, Agent, or Firm* — Fish & Richardson P.C.

(57) ABSTRACT

Disclosed is a method and apparatus for inspecting defects in a washer based on deep learning. According to an embodiment of the present disclosure, a method for inspecting defects in a washer based on deep learning gathers learning data while the washer operates and trains a first ANN model for diagnosing the condition of the washer and a second ANN model for securing the reliability of the result of inspection of the condition of the washer. Thereafter, the washer may make a diagnosis of whether the washer is defective based on the two pre-trained ANN models and are thereby able to continuously monitor whether the washer has an abnormal condition. According to an embodiment, the artificial intelligence (AI) module may be related to unmanned aerial vehicles (UAVs), robots, augmented reality (AR) devices, virtual reality (VR) devices, and 5G service-related devices.

20 Claims, 11 Drawing Sheets

METHOD AND APPARATUS FOR INSPECTING DEFECTS IN WASHER BASED ON DEEP LEARNING

CROSS-REFERENCE TO RELATED APPLICATIONS

This application claims the benefit of priority to KR 10-2019-0097384, filed on Aug. 9, 2019, the contents of which is hereby incorporated by reference in its entirety.

TECHNICAL FIELD

The present disclosure relates to a method and apparatus for inspecting defects in a washer based on deep learning, and more specifically, to a method and apparatus for inspecting defects in a washer based on deep learning, which may continuously monitor the condition of the washer.

DISCUSSION OF RELATED ART

Generally, washer or washing machine refers to an apparatus for processing laundry, e.g., clothing or bedding, by applying physical and/or chemical actions to the laundry. A washer includes an outer tub which contains wash water and an inner tub which receives laundry and is spinnable inside the outer tub. For a laundry wash, a washer typically undergoes a washing cycle and a spin cycle. The washing cycle rotates the inner tub of the washer to remove dirt and stains. The spin cycle removes water by the centrifugal force of the inner tub.

A washer needs to be installed in a balanced position for normal operation and, if broken or worn-out, the washer may not work properly.

Conventional ways to inspect the condition of a washer may simply check significant changes in the washer, such as wire disconnections or destruction, or predict the lifetime of the parts based on how long the washer has been in use, but are unable to inspect the operation condition of the washer.

SUMMARY

The present disclosure aims to address the foregoing issues and/or needs.

The present disclosure aims to implement a method and apparatus for inspecting defects in a washer based on deep learning, which are capable of continuously inspecting the condition of the washer.

The present disclosure also aims to implement a method and apparatus for inspecting defects in a washer based on deep learning, which are capable of enhancing the reliability of inspection result data.

The present disclosure aims to implement a method and apparatus for inspecting defects in a washer based on deep learning, which are capable of eliciting a proper condition inspection result although the use environment of the washer is varied.

According to an embodiment of the present disclosure, a method for inspecting defects in a washer based on deep learning comprises gathering data related to an operation of the washer via a data collector while the washer operates, determining learning data based on the gathered data related to the operation of the washer, training a first artificial neural network (ANN) model, with the learning data and washer condition data set as input data and output data, respectively, training a second ANN model, with the learning data set as input data and output data, generating a condition inspection model of the washer by combining the trained first ANN and second ANN, and inspecting whether the washer is defective based on the condition inspection model of the washer. The learning data may include at least one of an rRPM, a cRPM, an Iq, a UB, gyro three-axis data, and acceleration three-axis data. The washer condition data may include at least one of normal, broken, worn-out, or misinstalled.

Gathering the data related to the operation of the washer may include gathering learning data corresponding to each condition including at least one of normal, broken, worn-out, or misinstalled and a laundry level based on the condition of the washer and the laundry level.

Gathering the data related to the operation of the washer may be performed during a period of at least 60 msec or more.

The second ANN model may be an autoencoder.

Inspecting whether the washer is defective may include, determining data under inspection based on the gathered data related to the operation of the washer, if the number of pieces of the data under inspection is a preset threshold or more, inputting the data under inspection, as the input data, to the second ANN model, and comparing the input data and output data of the second ANN model to calculate a mean square error (MSE). If the MSE is a preset threshold or more, determination regarding the inspection of the condition of the washer may be put on hold.

The method may further comprise, if the MSE is less than the preset threshold, inputting the data under inspection as the input data of the first ANN model, and determining the condition of the washer based on the output data of the first ANN model.

The method may further comprise, if the MSE is the preset threshold or more, regathering the data related to the operation of the washer via the data collector while the washer operates, redetermining the data under inspection based on the regathered data, and reinspecting whether the washer is defective based on the condition inspection model of the washer.

The method may further comprise, if the condition of the washer is determined to be normal, regathering the data related to the operation of the washer via the data collector while the washer operates, determining the data under inspection based on the regathered data related to the operation of the washer, and reinspecting whether the washer is defective based on the condition inspection model of the washer.

The method may further comprise inputting assessment data to the condition inspection model of the washer, and retrain the condition inspection model if data output from the condition inspection model of the washer, with the assessment data set as input data, fails to meet a preset reference.

Retraining the condition inspection model may include assessing the output data as failing to meet the preset reference if the number or proportion of pieces of the assessment data for which a result of analysis of the output data is incorrect exceeds a preset threshold.

According to another embodiment of the present disclosure, a method for inspecting defects in a washer based on deep learning comprises receiving data related to an operation of the washer, gathered via a data collector while the washer operates, determining learning data based on the received data related to the operation of the washer, training a first artificial neural network (ANN) model, with the learning data and washer condition data set as input data and output data, respectively, training a second ANN model, with the learning data set as input data and output data, generating a condition inspection model of the washer by combining the trained first ANN and second ANN, inspecting whether the washer is defective based on the condition inspection model of the washer, and transmitting a condition inspection result of the washer to the washer. The learning data includes at least one of an rRPM, a cRPM, an Iq, a UB, gyro three-axis data, and acceleration three-axis data. The washer condition data may include at least one of normal, broken, worn-out, or misinstalled.

According to another embodiment of the present disclosure, a washer with a defect inspection model based on deep learning comprises a data collector, a transceiver, a memory, and an artificial intelligence (AI) processor. The data collector gathers data related to an operation of the washer while the washer operates. The AI processor determines learning data based on the gathered data related to the operation of the washer, trains a first artificial neural network (ANN) model, with the learning data and washer condition data set as input data and output data, respectively, trains a second ANN model, with the learning data set as input data and output data, generates a condition inspection model of the washer by combining the trained first ANN and second ANN, and inspects whether the washer is defective based on the condition inspection model of the washer. The learning data may include at least one of an rRPM, a cRPM, an Iq, a UB, gyro three-axis data, and acceleration three-axis data. The washer condition data may include at least one of normal, broken, worn-out, or misinstalled.

According to another embodiment of the present disclosure, an AI device with a defect inspection model based on deep learning comprises a transceiver, a memory, an AI processor. The transceiver receives data related to an operation of the washer, gathered via a data collector while the washer operates and transmits a condition inspection result to the washer. The AI processor determines learning data based on the received data related to the operation of the washer, trains a first artificial neural network (ANN) model, with the learning data and washer condition data set as input data and output data, respectively, trains a second ANN model, with the learning data set as input data and output data, generates a condition inspection model of the washer by combining the trained first ANN and second ANN, and inspects whether the washer is defective based on the condition inspection model of the washer. The learning data may include at least one of an rRPM, a cRPM, an Iq, a UB, gyro three-axis data, and acceleration three-axis data. The washer condition data may include at least one According to the embodiments of the present disclosure, a method and apparatus for inspecting defects in a washer based on deep learning provide the following effects.

The embodiments of the disclosure may continuously inspect the condition of the washer.

The embodiments of the disclosure may enhance the reliability of inspection result data.

The embodiments of the disclosure may elicit a proper condition inspection result although the use environment of the washer is varied.

Effects of the present disclosure are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

A more complete appreciation of the present disclosure and many of the attendant aspects thereof will be readily obtained as the same becomes better understood by reference to the following detailed description when considered in connection with the accompanying drawings.

DETAILED DESCRIPTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
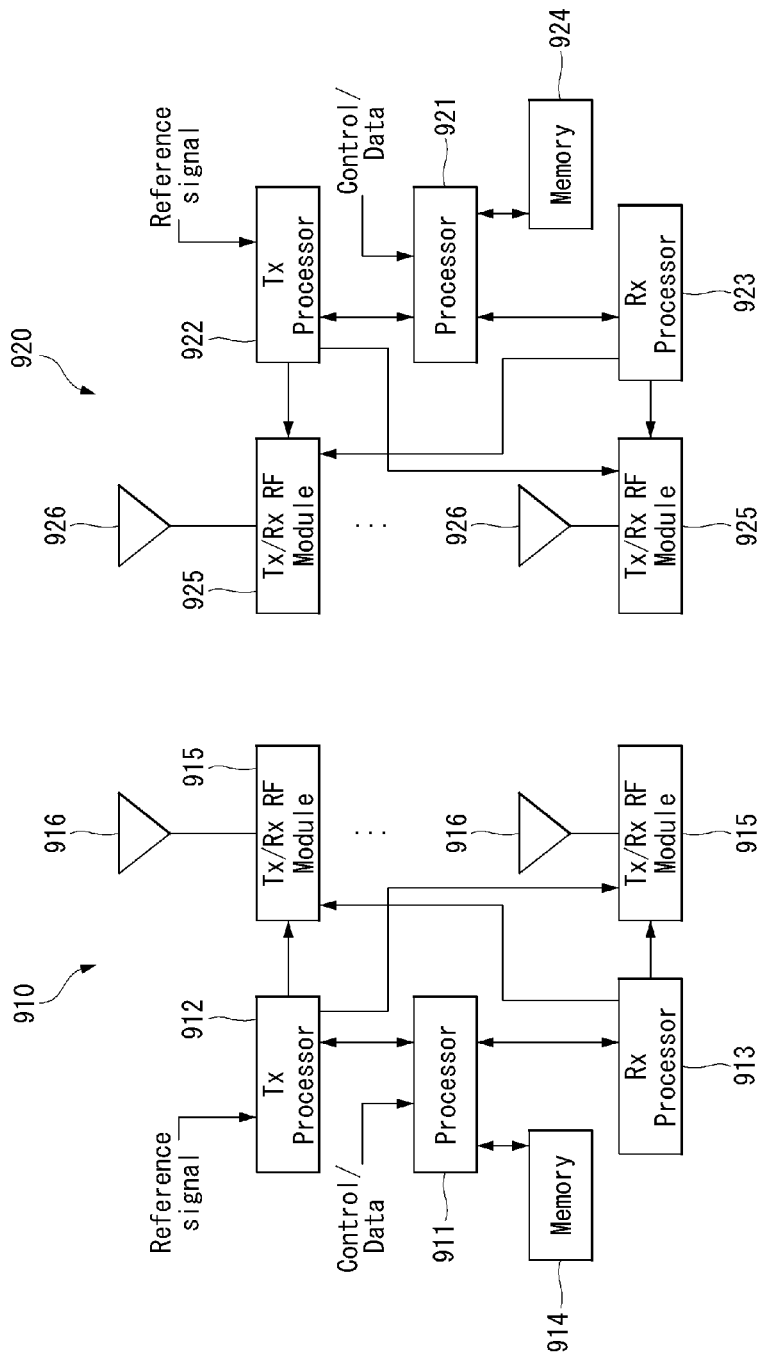
FIG. 1 is a block diagram illustrating a configuration of a wireless communication system to which methods proposed herein may apply.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
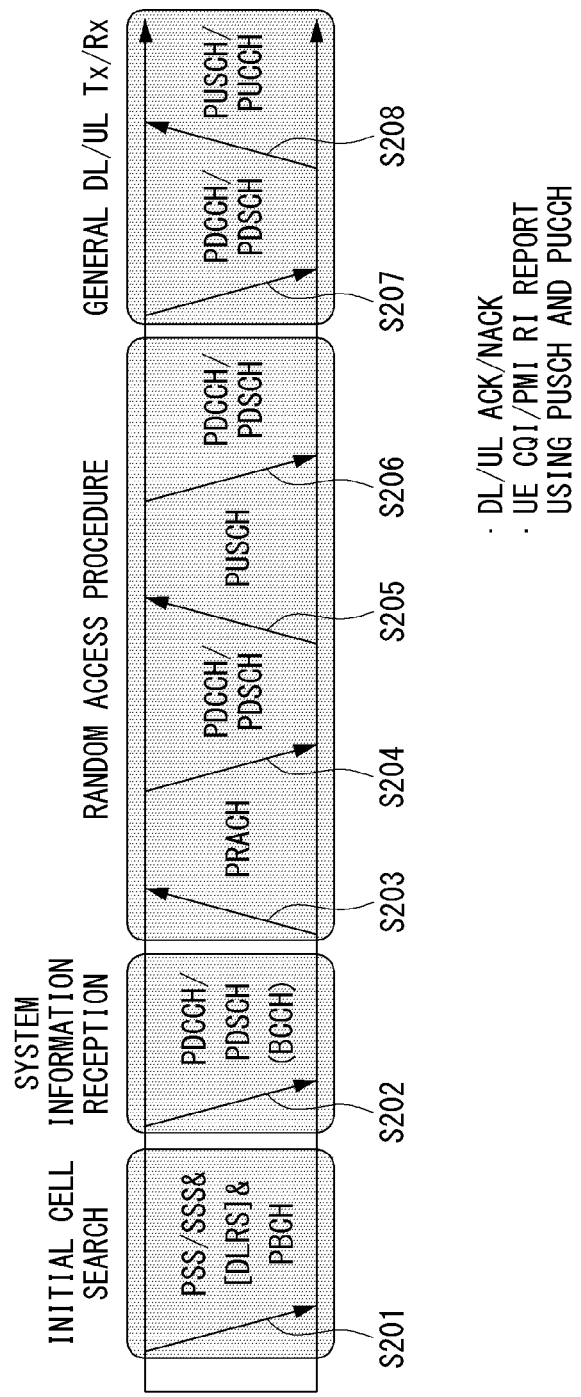
FIG. 2 is a view illustrating an example method of transmitting/receiving signals in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3)

extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
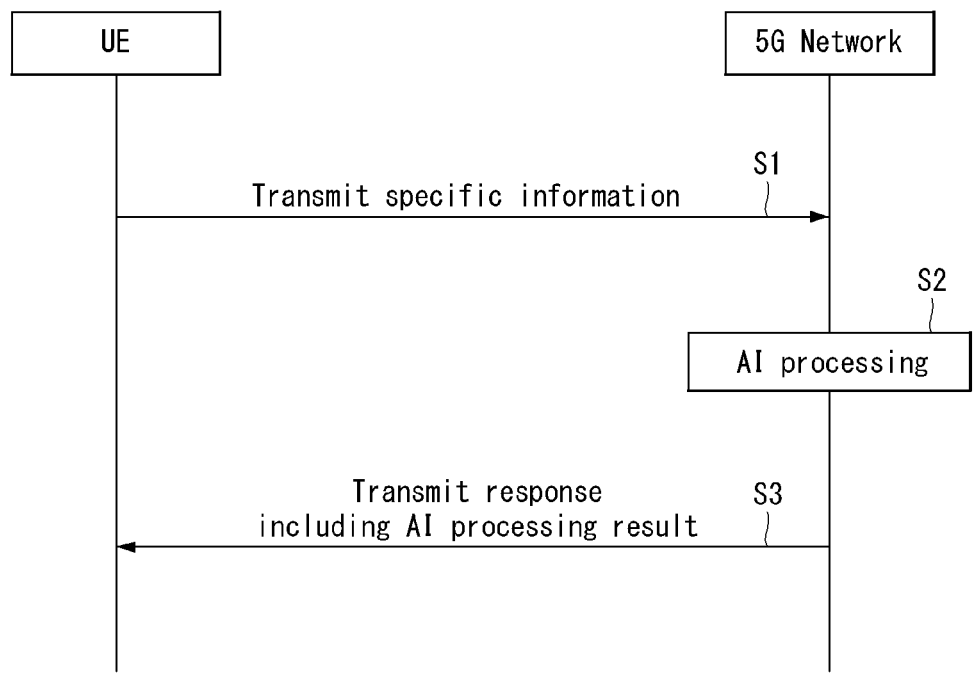
FIG. 3 is a view illustrating example basic operations of a user terminal and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
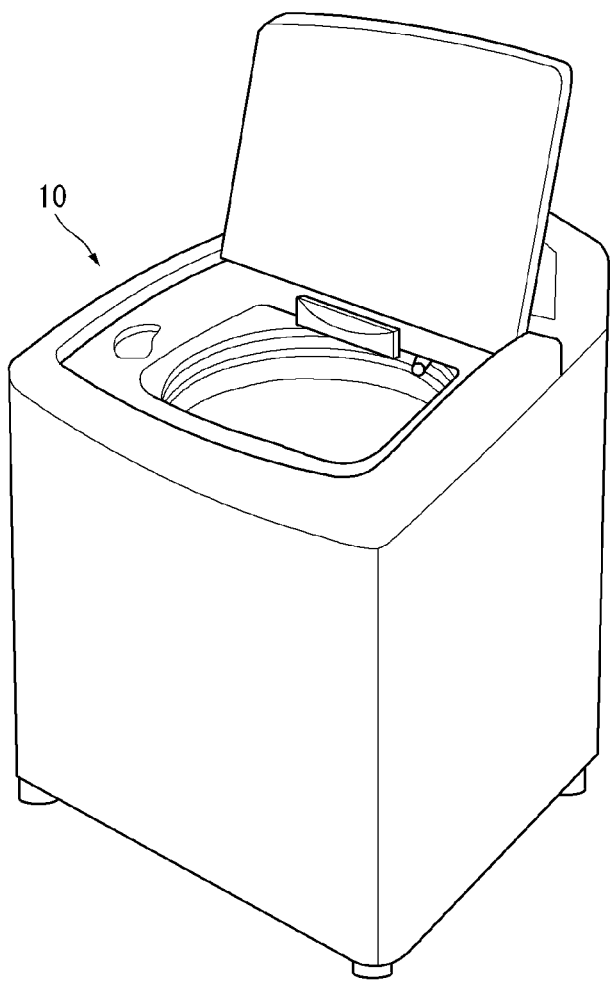
FIGS. 4 and 5 are views illustrating an intelligent washer according to an embodiment of the present disclosure.
Figure 5:
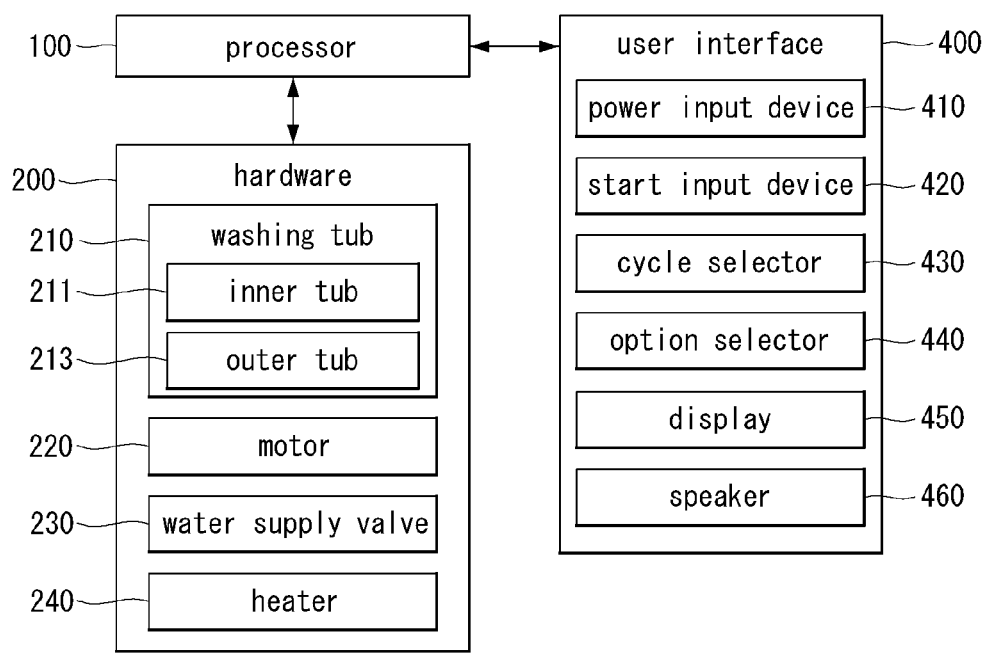

FIG. 4 is a view illustrating an intelligent washer according to an embodiment of the present disclosure. FIG. 5 is a block diagram illustrating major components of the washer of FIG. 4.

Referring to FIGS. 4 and 5, according to an embodiment, a washer 10 includes a processor 100, hardware 200, an image obtaining device 300, and a user interface 400.

The processor 100 controls the hardware 200 according to information input via the user interface 400, thereby controlling the overall operation of the washer 10. The processor 100 controls the operation of the hardware 200 based on a laundry image obtained via the image obtaining device 300. Specifically, the processor 100 may obtain laundry classification information or laundry distribution information from the laundry image and control the operation of the hardware 200 based on the laundry classification information or the laundry distribution information. The laundry classification information is information for, e.g., the kind or material of the laundry and, particularly, may denote the moisture content of the laundry. The laundry distribution information may denote the degree of distribution of, or height information for, the laundry in the inner tub 211.

The processor 100 may learn the laundry distribution information, predict the degree of vibration of the inner tub 211, which may occur during the spin cycle, and vary the revolutions per minute (RPM) of the motor 220 during the spin cycle depending on the degree of vibration. For example, if the laundry is determined to probably cause a short circuit based on the laundry classification information, the processor 100 may control the motor 220 to reduce the RPM during the spin cycle.

The hardware 200 may include the washing tub 210, the motor 220, a water supply valve 230, and the heater 240.

The washing tub 210 includes an outer tub 213 which contains wash water and the inner tub 211 which is disposed inside of the outer tub 213 to receive laundry and is spun by the rotating power received from the motor 220. The water supply valve 230 controls the supply of wash water. The heater 240 heats the water in the washing tub 210.

The image obtaining device 300 obtains an image for the laundry placed in the inner tub 211. The image obtaining device 300 may use at least any one of a 2D camera or a 3D camera and may be disposed on the cover of the washer 10.

The user interface 400 may include a power input device 410, a start input device 420, a cycle selector 430, an option selector 440, a display 450, and a speaker 460.

The power input device 410 provides a means for controlling the on/off of the main power source of the washer 10. The start input device 420 provides a means for controlling the start of the wash cycle, rinse cycle, or spin cycle. The cycle selector 430 provides a means for selecting the type of the wash cycle, rinse cycle, or spin cycle. The option selector 440 provides a means for selecting detailed options to proceed with the wash, rinse, or spin cycle. For example, the option selector 440 may be a means for selecting options, such as water temperature, time, or reservation. The display 450 may display the operation condition of the washer 10 or may display cycle information selected by the user via the cycle selector 430 or option information selected via the option selector 440. The speaker 460 outputs the operation condition of the washer 10 or a circumstance for a particular event in a voice signal. The particular event may be a circumstance for laundry distribution control or RPM control based on a laundry image.

Figure 6:
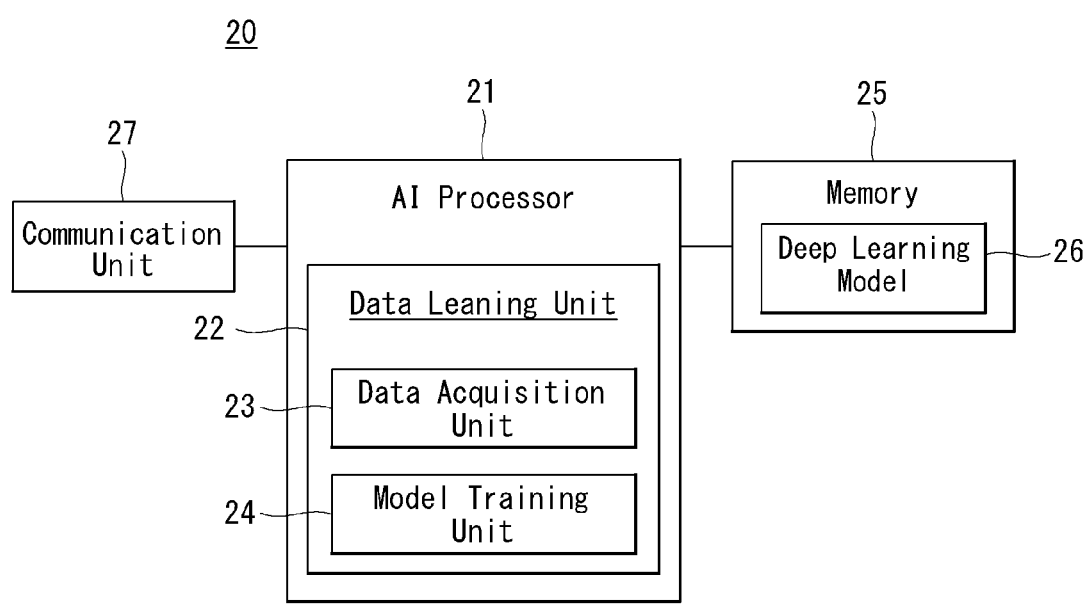
FIG. 6 is a block diagram illustrating an AI device according to an embodiment of the present disclosure.

FIG. 6 is a block diagram illustrating an AI device according to an embodiment of the present disclosure.

Referring to FIG. 6, an AI device 20 may include an electronic device including an AI module capable of AI processing or a server including an AI module. The AI device 20 may be included as at least a component of the washer 10 of FIGS. 4 and 5 so that the AI device 20 may perform at least part of AI processing along therewith.

AI processing may include all operations related to the processor 100 of the washer 10 of FIG. 4. For example, the washer 10 perform AI processing the laundry image or laundry classification information or laundry distribution information, thereby performing processing/determination and generating control signals.

The AI device 20 may be a client device which directly uses the results of AI processing or a cloud-environment device which provides the results of AI processing to other devices. The AI device 20 may be a computing device capable of training neural networks and may be implemented as at least one of various electronic devices, such as servers, desktop PCs, laptop computers, or tablet PCs.

The AI device 20 may include an AI processor 21, a memory 25, and/or a transceiver 27.

The AI processor 21 may train the ANN based on the program stored in the memory 25. In particular, the AI processor 21 may train a neural network for recognizing relevant data of the washer 10. The neural network for recognizing the relevant data of the washer 10 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

Supervised learning is performed based on a series of learning data and its corresponding label (target output), and the supervised learning-based ANN may be in the form of inferring a function from training data. Supervised learning may figure out errors by receiving a series of learning data and its corresponding target output and comparing the actual output for the input data with the target output and may modify the model based on the result. Supervised learning may be divided into regression, classification, detection, and semantic segmentation. The function derived by supervised learning may be used to predict a new result. As such, the supervised learning-based ANN may optimize its parameters by learning a vast amount of learning data.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 5 was functionally separately described into the AI processor 21, the memory 25, the communication unit 27, etc., but it should be noted that the aforementioned components may be integrated in one module and referred to as an AI module.

Figure 7A:
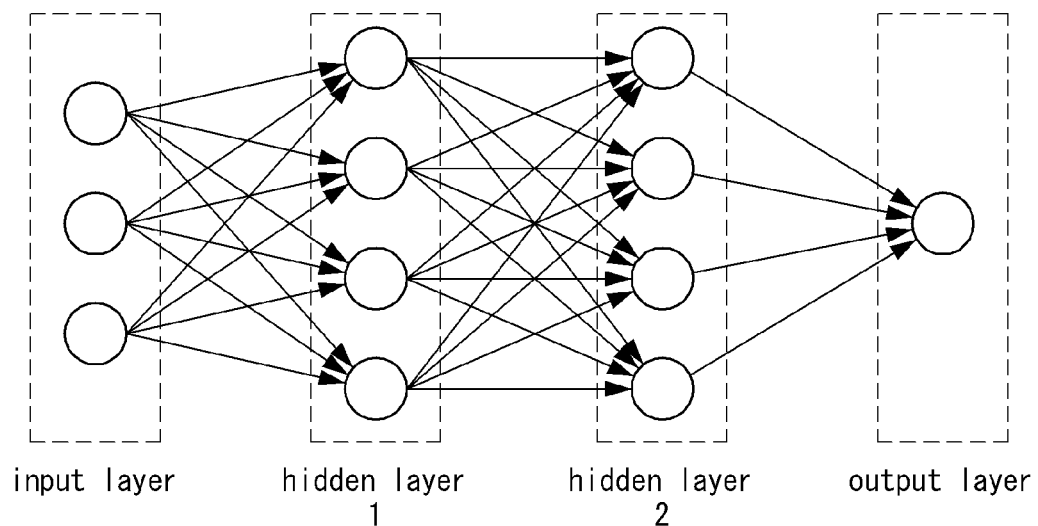
FIGS. 7A and 7B are views illustrating an artificial neural network according to an embodiment of the present disclosure.
Figure 7B:
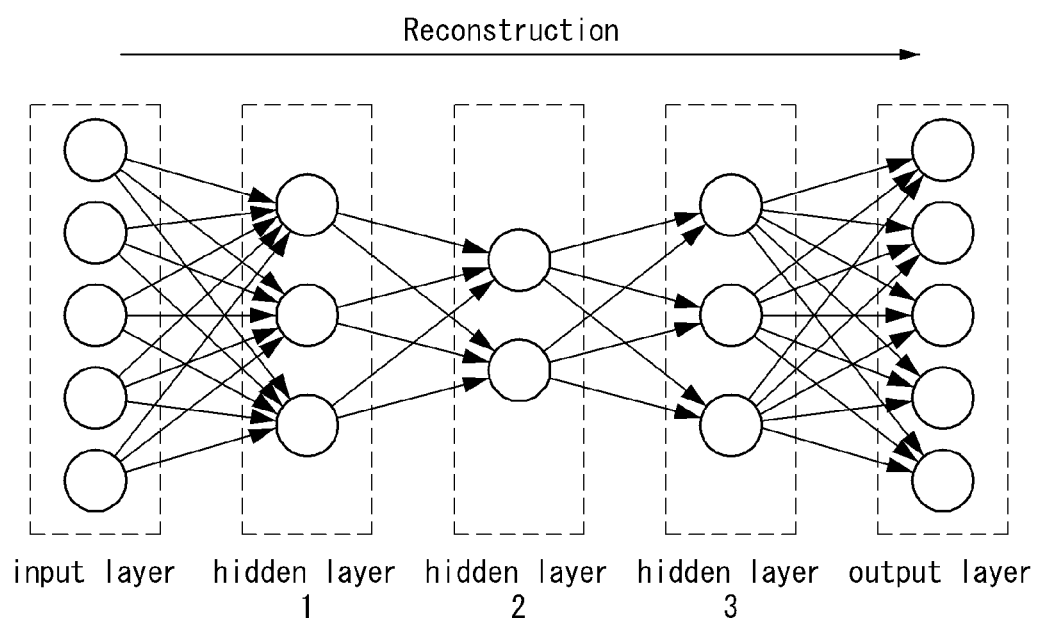

FIGS. 7A and 7B are views illustrating an artificial neural network according to an embodiment of the present disclosure.

For example, FIG. 7A is a view illustrating a general structure of an artificial neural network (ANN), and FIG. 7B is a view illustrating an autoencoder that undergoes a reconstruction step after encoding and while decoding of the ANN.

The ANN may typically include an input layer, a hidden layer, and an output layer, and neurons included in each layer may be connected together via weights. The ANN may approximate a complicated function by linear combinations of neuron values and a non-linear activation function. Training the ANN aims to figure out a weight that minimizes the difference between the output calculated in the output layer and the actual output.

Deep neural network may mean an ANN including several hidden layers between the input layer and output layer. By using many hidden layers, complicated non-linear relations may be modeled. As such, a neural network structure capable of highly advanced abstracting by increasing the number of layers is called deep learning. Deep learning may learn vast amounts of data and, if new data is input, select the stochastically highest answer based on the result of learning. Thus, deep learning may be adaptively operated depending on inputs and automatically find out feature factors during the course of training the model based on data.

The deep learning-based model may include, but is not limited to, various deep learning schemes, such as deep neural networks (DNN), convolutional deep neural networks (CNN), recurrent Boltzmann machine (RNN), restricted Boltzmann machine (RBM), deep belief networks (DBN), and deep Q-network, as described above in connection with FIG. 6. Also included are other machine learning methods than deep learning. For example, the features of input data may be extracted based on the deep learning-based model, and a machine learning-based model may be used to classify or recognize the input data based on the extracted features. The machine learning-based model may include, but is not limited to, support vector machines (SVMs) or AdaBoost.

Referring to FIG. 7A, according to an embodiment of the present disclosure, the ANN may include an input layer, hidden layers, an output layer, and weights. For example, FIG. 7A illustrates a structure of an ANN including an input layer with a size of 3, first and second hidden layers with a size of 4, and an output layer with a size of 1. For example, the neurons included in the hidden layers may be connected with the neurons included in the input layer via linear combinations with individual weights included in the weights. The neurons included in the output layer may be connected with the neurons included in the hidden layers via linear combinations with individual weights included in the weights. The ANN may find the weight that minimizes the difference between the output calculated in the output layer and the actual output.

According to an embodiment of the present disclosure, the ANN may have an ANN structure including an input layer with a size of 10, an output layer with a size of 4, and a hidden layer whose size is not defined. In this case, the data determined to be learning data based on data related to the operation of the washer 10 may be input as input data. For example, the request RPM (rRPM), current RPM (cRPM), Iq (q-axis current), unbalance (UB), data for the three gyro axes, and data for the three acceleration axes, which are related to the operation of the washer 10, may be input to the input layer, and output values, corresponding to normal, broken, worn-out, and output error, may be output from the output layer.

Referring to FIG. 7B, according to an embodiment of the present disclosure, the ANN may include an autoencoder. If raw data is input to the ANN, then encoded, and then the encoded data is decoded and reconstructed, a slight difference may be made between the input data and the reconstructed data. The autoencoder is an ANN that utilizes such difference. For example, the autoencoder may include an input layer with a size of 5, an output layer with the same size as the input layer, a first hidden layer with a size of 3, a second hidden layer with a size of 2, and a third hidden layer with a size 3 and may be structured so that the number of the nodes of the hidden layers gradually decreases to the intermediate layer and gradually increases to the output layer. The autoencoder shown in FIG. 7B is merely an example, and embodiments of the disclosure are not limited thereto. The autoencoder may compare the input value of the raw data with the output value of the reconstructed data and, if the difference is great, the autoencoder may determine not to learn the corresponding data, and if the difference between the input value and output value is small, determine that the corresponding data has been previously learned. Thus, the use of the autoencoder leads to an increase in the reliability of data.

In this case, the mean square error (MSE) may be put to use to compare the input value and the output value. As the MSE is larger, the data may be determined to have not been learned and, as the MSE is smaller, the data may be determined to have already been learned. According to an embodiment of the present disclosure, if the MSE is less than a preset threshold, the data may be determined to be data already learned, and the data under inspection may be input to the input layer of the first ANN model, and the condition of the washer 10 may be determined based on the output data from the first ANN model. The output data of 0, 1, 2, and 3 may be determined to be normal, broken, worn-out, and misinstalled, respectively.

Figure 8:
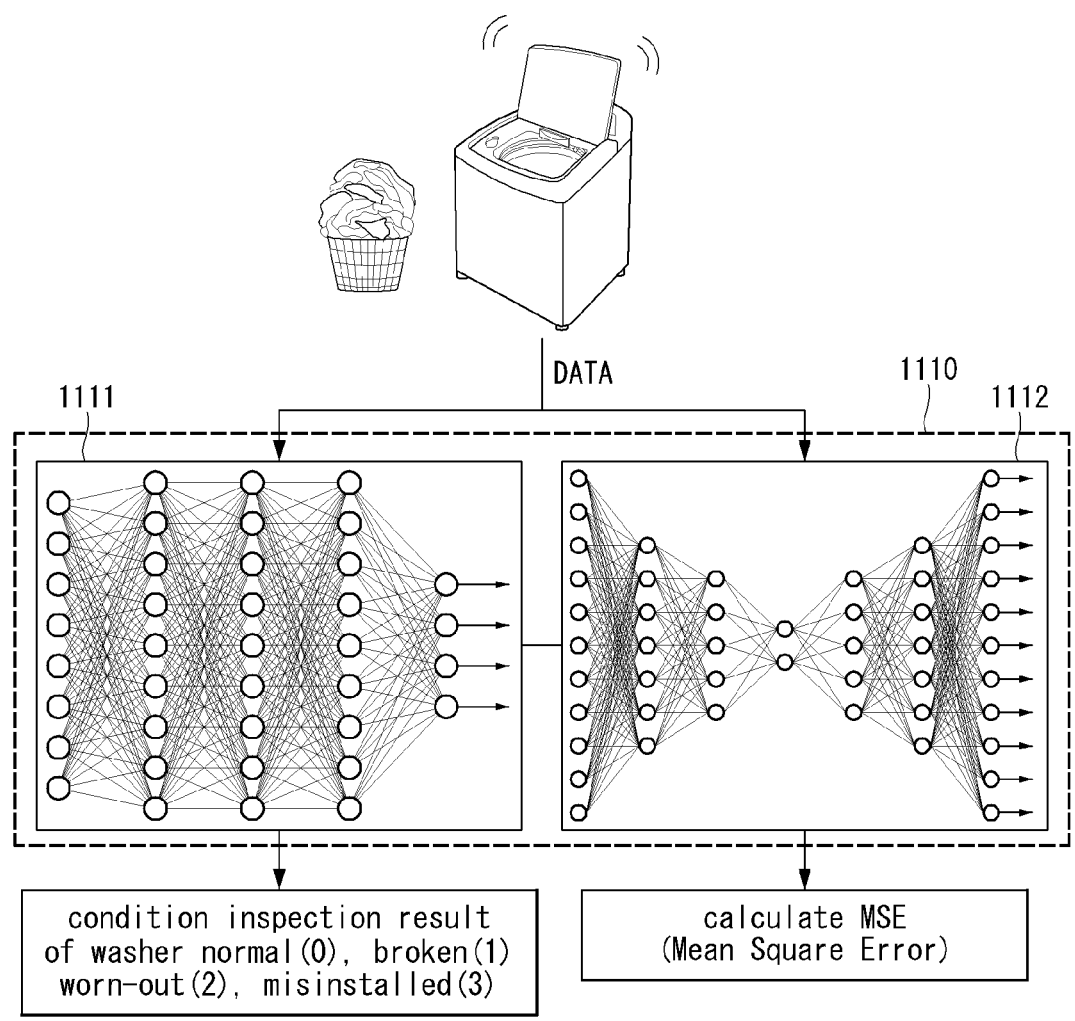
FIG. 8 is a view illustrating a condition inspection model according to an embodiment of the present disclosure.

FIG. 8 is a view illustrating a condition inspection model according to an embodiment of the present disclosure.

Referring to FIG. 8, a washer condition inspection model 1110 may include a first ANN model 1111 and a second ANN model 1112. If data related to the operation of the washer is input to the input layer, the first ANN model 1111 may output the result of inspection of the condition of the washer. If data related to the operation of the washer is input to the input layer, the second ANN model 1112 may output the reconstructed data of the input data. The second ANN model 1112 may compare the input data and the reconstructed data, thereby identifying the reliability of the condition inspection model 1110.

The first ANN model 1111 may obtain the value of data under inspection while the data under inspection is simultaneously input to the second ANN model 1112. If data under inspection is first input to the second ANN model 1112 and is determined to be unreliable, the washer condition inspection via the first ANN model 1111 may be put on hold.

According to various embodiments of the present disclosure, to remove noise from the input data under inspection, the condition of the washer may be inspected, with the reconstructed data output from the second ANN model 1112 set as the input data of the first ANN model 1111.

Figure 9:
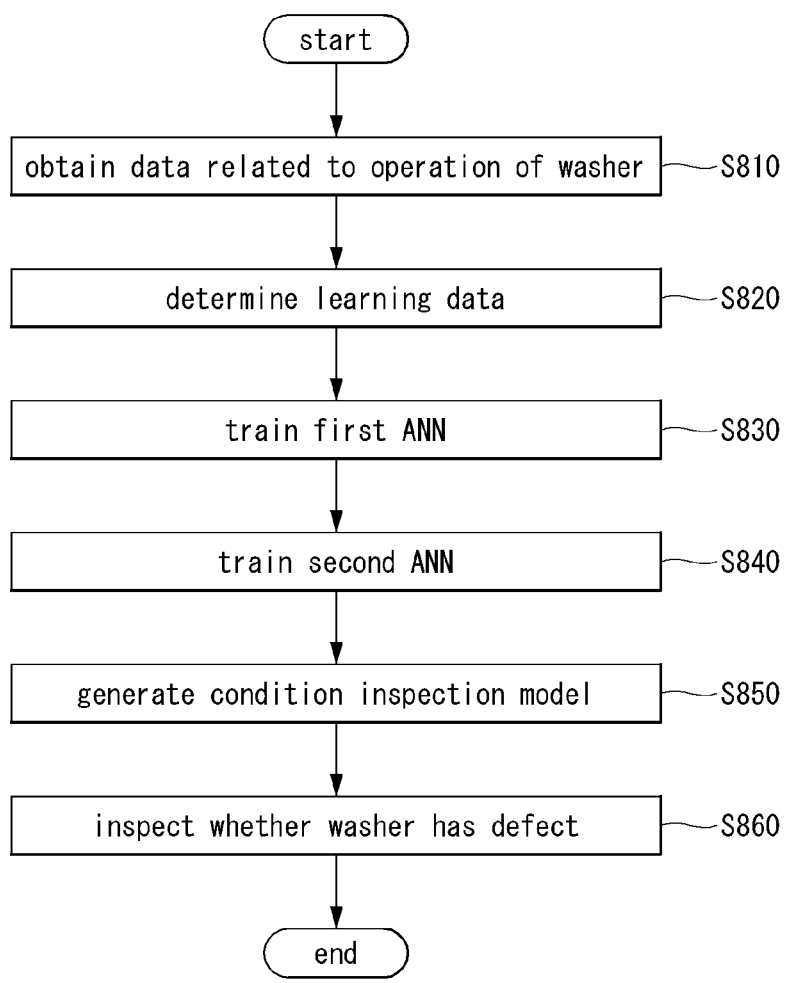
FIGS. 9 and 10 are flowcharts illustrating a method for inspecting defects in a washer according to an embodiment of the present disclosure.
Figure 10:
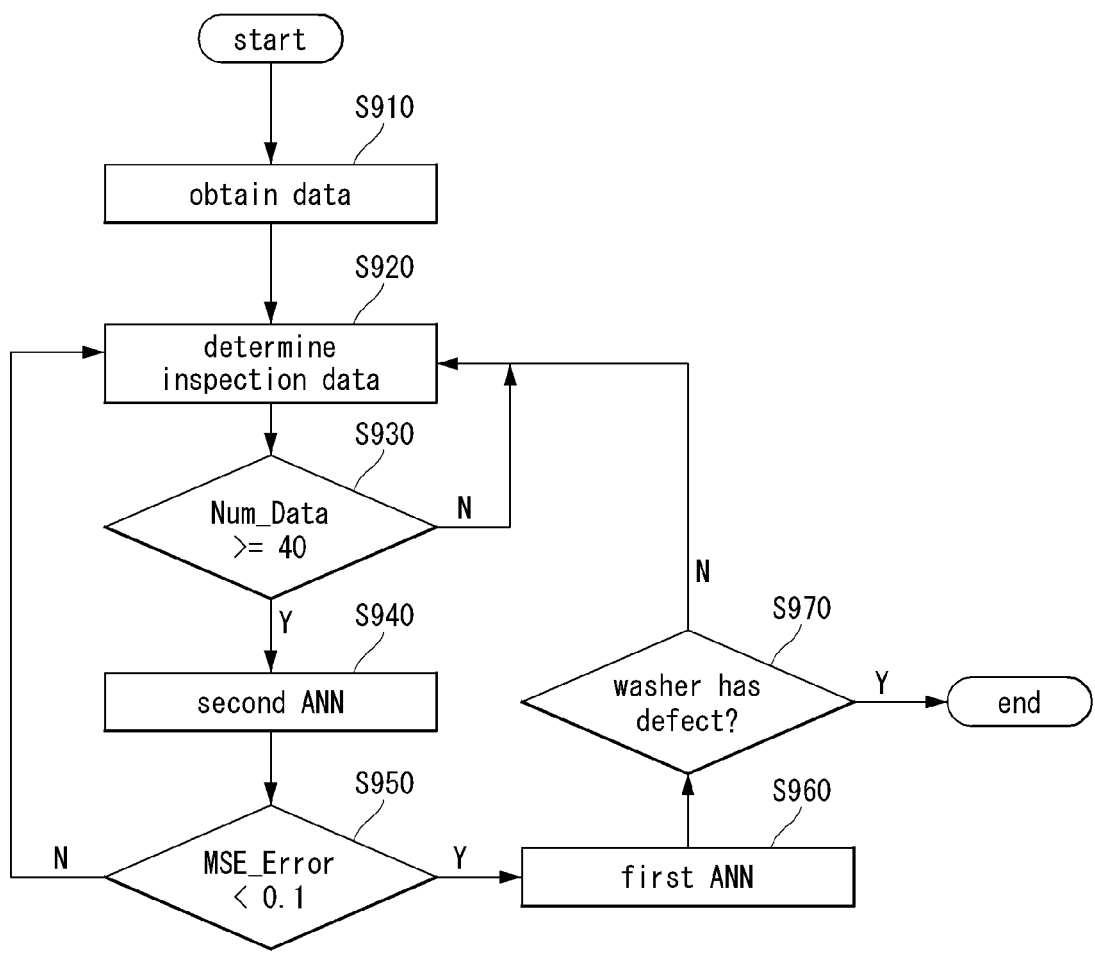

FIGS. 9 and 10 are flowcharts illustrating a method for inspecting defects in a washer according to an embodiment of the present disclosure.

FIG. 9 illustrates a specific method for inspecting whether the washer is defective based on the first ANN model 1111 and the second ANN model 1112 previously trained. FIG. 9 shows a specific method for training the ANNs.

First, the washer 10 may obtain data related to the operation of the washer 10 via the data collector (S910).

The washer 10 may gather the data related to the operation of the washer 10 via at least one data collector capable of detecting the operation of the washer 10. The data related to the operation of the washer 10 may include, but is not limited to, such information as, e.g., rRPM, cRPM, Iq, UB, three gyro axes, three acceleration axes, or water level. According to an embodiment of the present disclosure, the AI processor 21 may gather data corresponding to each condition of the washer 10 and the laundry level based on the laundry level and the conditions of the washer 10, which include at least one of normal, broken, worn-out, or misinstalled while the washer 10 operates. For example, the data may be gathered by repeatedly executing a profile per laundry level and per condition. For example, when the washer 10 is in the normal condition, the washer 10 may be operated, with the laundry level changed from a first laundry level through a seventh laundry level, and the data related to the operation of the washer 10 may be obtained corresponding to each laundry level in the normal condition, or when the washer 10 is in the broken condition, the washer 10 may be operated, with the laundry level changed from the first laundry level through the seventh laundry level, and the data related to the operation of the washer 10 may be obtained corresponding to each laundry level in the broken condition. In such a manner, data gathering may be repeated per condition of the washer 10 and per level. According to an embodiment of the present disclosure, gathering of the data related to the operation of the washer 10 may be performed for at least 60 msec or more.

Thereafter, the AI processor 21 may determine learning data based on the gathered data related to the operation of the washer 10 (S920).

The learning data obtaining unit 23 of the washer 10 may obtain learning data necessary for the ANN model for classifying and recognizing data. To be able to train the ANN model with a plurality of pieces of data gathered by the data collector of the washer 10, learning data necessary for the ANN model needs to be separated from the gathered data. According to an embodiment of the present disclosure, the learning data obtaining unit 23 may classify rRPM, cRPM, Iq, UB, data for three gyro axes, and data for three acceleration axes as learning data.

Thereafter, the AI processor 21 may train the first ANN model 1111, with the learning data set as input data and the condition data of the washer 10 as output data (S930).

The first ANN model 1111 may be trained via supervised learning which uses at least part of the learning data as a reference for determination. For example, the model training unit 24 may train the first ANN model 1111 by applying the obtained learning data to the input layer of the ANN and applying the output data corresponding to the condition of the washer 10, including at least one of normal, broken, worn-out, or misinstalled, to the output layer.

Then, the AI processor 21 may train the second ANN model 1112, with the learning data set as input data and output data (S940).

The second ANN model 1112 may be configured as an autoencoder. The autoencoder may secure data reliability as described above in connection with FIGS. 7A and 7B. According to an embodiment of the present disclosure, the AI processor 21 may train the second ANN model 1112 by applying the learning data to the input layer and output layer of the second ANN model 1112. Upon inspecting the condition of the washer 10, the trained second ANN model 1112 may compare the input data with the data reconstructed via the second ANN model 1112, thereby determining whether the input data has been learned before.

According to an embodiment of the present disclosure, if the input data under inspection is determined to be data not learned by the second ANN model 1112, the AI processor 21 may put the determination regarding inspection of the condition of the washer 10 on hold. If the input data is determined to have been not learned, data related to the operation of the washer 10 may be regathered via the data collector of the washer 10 and learning data may be separated from the data, and the first ANN model 1111 and the second ANN model 1112 may be retrained with the learning data.

Thereafter, the AI processor 21 may generate a condition inspection model 1110 of the washer 10 including the first ANN model 1111 and the second ANN model 1112 (S950).

The AI processor 21 may generate a deep learning model including the first ANN model 1111 and the second ANN model 1112 and store the deep learning model in the memory 25 for future use in inspecting the condition of the washer 10. For example, the first ANN model 1111 of the condition inspection model 1110 of the washer 10 may identify whether the washer 10 is abnormal, and the second ANN model 1112 may determine whether data input to the input layer is data already learned.

According to an embodiment of the present disclosure, assessment data may be input to the condition inspection model 1110 of the washer 10 and, if the output data fails to meet a preset reference, the condition inspection model 1110 may be retrained. If the number or proportion of pieces of the assessment data for which a result of analysis of the output data is incorrect exceeds a preset threshold, the output data may be assessed as failing to meet the preset reference.

Thereafter, the AI processor 21 may perform inspection as to whether the washer 10 is defective based on the condition inspection model 1110 of the washer 10 (S960).

As a result of training, if data under inspection is input to the pre-trained first ANN model 1111, the first ANN model 1111 may determine the condition of the washer 10 depending on the input data. For example, the first ANN model 1111 may output the value 0, 1, 2, or 3 depending on particular input data. In this case, 0, 1, 2, and 3 may be set to correspond to normal, broken, worn-out, and misinstalled, respectively, and the AI processor 21 may determine the condition of the washer 10 based thereupon.

According to an embodiment of the present disclosure, if the washer 10 is determined to be in the normal condition as a result of output from the first ANN model 1111, data related to the operation of the washer 10 may be regathered while the washer 10 operates, and data under inspection may be redetermined based on the regathered data related to the operation of the washer 10, and then inspection as to whether the washer 10 is defective may be repeated. Such repeated inspection enables a real-timing monitoring of whether the washer 10 is defective.

As a result of training, if data under inspection is input to the pre-trained second ANN model 1112, the second ANN model 1112 may determine whether the input data is pre-learned data depending on the input data. Unless the input data is pre-learned data, although it is input to the first ANN model 1111, it is hard to obtain a reliable output, and the result of inspection of the condition of the washer 10 may be unreliable. Thus, the second ANN model 1112 may adopt the MSE. If the MSE is less than a preset threshold, the second ANN model 1112 may determine that the data is learned data and, if the MSE is not less than the preset threshold, determine that the data has yet to be learned. In this case, the preset threshold may be 0.1.

As set forth above, upon determining that the input data has yet to be learned, the AI processor 21 may retrain the condition model of the washer 10. Such retraining allows the inspection of condition of the washer 10 to work properly even when in use in different environments than in the initial design or processing stage. For example, if the washer 10 has been manufactured in Korea, the condition inspection model 1110 is trained in the environment of the country, and input data in a tropical region is not learned by the condition inspection model 1110 of the washer 10. As such, if the washer 10 is used in a different environment, the condition inspection model 1110 does or may malfunction due to differences in input data. The second ANN model 1112 may contribute to properly inspecting the condition of the washer 10. The above-described retraining enables inspection of the condition of the washer 10 without errors even in other environments.

FIG. 10 illustrates a specific method for inspecting defects in a washer according to an embodiment of the present disclosure. FIG. 10 illustrates a specific example method of inspecting defects in a washer based on a pre-trained condition inspection model 1110. The following description focuses primarily on differences from what has been described above in connection with FIG. 8.

The AI processor 21 may gather data related to the operation of the washer 10 via the data collector while the washer 10 operates (S1010).

The data collector may include, but is not limited to, water level sensors, vibration sensors, hall sensors, current sensors, inertia sensors, acceleration sensors, or other sensors, and/or a control information collector capable of gathering control information including the cRPM, rRPM, UB, or Iq.

The AI processor 21 may determine data under inspection for diagnosing a defect in the washer 10 from among the gathered data related to the operation of the washer 10 (S1020).

The data under inspection may be classified or determined as the same kind of data as learning data used to train the ANN. The data under inspection may not need as much quantity as the learning data. However, a prerequisite for reliable inspection on the washer 10 may be that 40 frames or more of information related to the operation of the washer 10 including at least one of the rRPM, cRPM, Iq, UB, data for the three gyro axes, or data for the three acceleration axes be obtained.

If the number of the pieces of data under inspection is a preset threshold or more, the data under inspection, as the input data, may be input to the second ANN model 1112 (S1030).

In this case, the second ANN model 1112 may output a reconstructed data for the data under inspection, and the AI processor 21 may compare the data under inspection with the reconstructed data, thereby enhancing the reliability of inspection of condition of the washer 10.

The AI processor 21 may compare the input data and with the output data from the second ANN model 1112 to calculate the MSE and determine whether the MSE is less than a preset threshold (S1040).

If the MSE is less than the preset threshold, the AI processor 21 may input the data under inspection as the input data of the first ANN model 1111 and, if the MSE is not less than the preset threshold, put the determination regarding of the inspection of condition of the washer 10 on hold.

The step of inputting the data under inspection to the first ANN model 1111 and the step of inputting the data under inspection to the second ANN model 1112 are not limited in terms of temporal or logical priority but may rather be used temporally. For example, if although the data under inspection is input first to the first ANN model 1111, the data under inspection is input to the second ANN model 1112 and is determined to be data not learned, the output value related to the condition of the washer 10, which is obtained via the first ANN model 1111, may be determined to be unreliable information, and if the data under inspection is input first to the second ANN model 1112 and is determined to be data not learned, inspection of the condition of the washer 10 via the first ANN model 1111 may be put on hold, or the result of inspection condition determined may be regarded as unreliable.

The AI processor 21 may input the data under inspection to the first ANN model 1111 (S1050).

The first ANN model 1111 may receive the data under inspection, thereby determining whether the washer 10 is defective. If the washer 10 is determined to be in the normal condition, data related to the operation of the washer 10 may be regathered via the data collector while the washer 10 is operated again at a particular time, data under inspection may be redetermined, and it may be reinspected whether the washer 10 is defective. By so doing, the AI processor 21 may steadily monitor the condition of the washer 10.

Thereafter, the AI processor 21 may determine whether the washer 10 is defective based on the first ANN model 1111 (S1060).

The washer may provide a notification for the result of washer condition inspection via the display 450 and/or speaker 460 of the washer.

Figure 11:
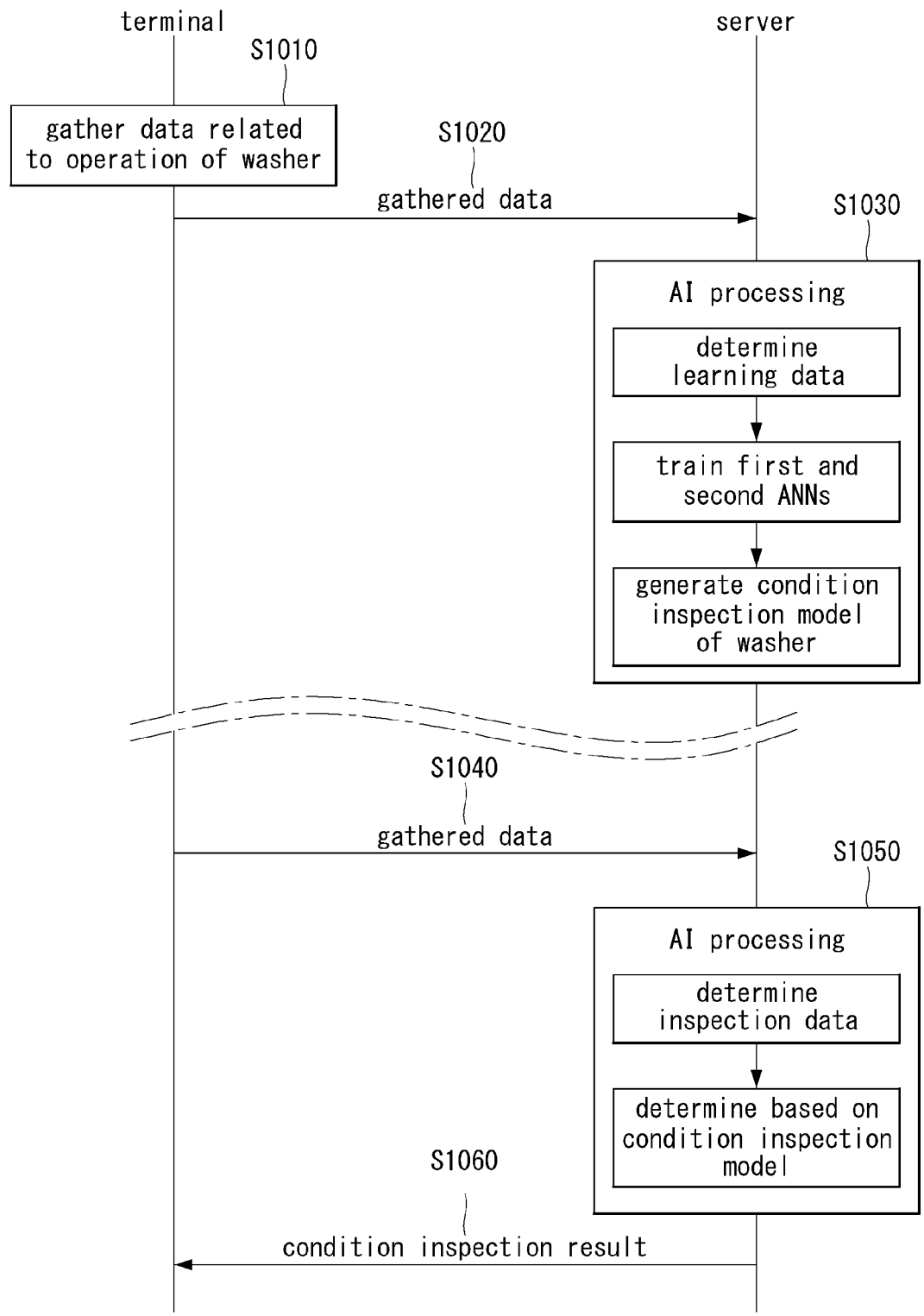
FIG. 11 is a sequence diagram illustrating a method for inspecting defects in a washer including a server according to another embodiment of the present disclosure.

FIG. 11 is a sequence diagram illustrating a method for inspecting defects in a washer including a server according to another embodiment of the present disclosure. No more discussions are presented below for the same features as those described above in connection with FIGS. 9 and 10.

The washer 10 may gather data related to the operation of the washer 10 via the data collector (S1010).

The data gathered by the washer 10 may be transmitted to a server for use in training the ANN included in the AI processor 21 of the server.

The server may receive the data related to the operation of the washer 10 from the washer 10 (S1020).

The server may determine learning data and train the first ANN model 1111 and the second ANN model 1112, generating the condition inspection model 1110 of the washer 10 (S1030).

In this case, the server may classify and determine learning data necessary for training the ANN based on the data received from the washer 10. The server may identify whether the input data of the first ANN model 1111, which inspects the condition of the washer, is learned data, thereby training the second ANN model 1112 capable of securing the reliability of the condition inspection result for the washer 10 via the first ANN model 1111. After generating the condition inspection model 1110 of the washer 10 including the first ANN model 1111 and the second ANN model 1112, the server may store the condition inspection model 1110 of the washer 10 in the memory 25.

The server may receive the data related to the operation of the washer 10 from the washer 10 (S1040).

The washer 10 may gather the data related to the operation of the washer 10 while the washer 10 operates and transmit the gathered data to the server. The washer 10 may transmit the data to the server steadily or upon receiving a data request message from the server which responds to a condition inspection request from the washer 10.

The server may determine data under inspection based on the data received from the washer 10 and determine whether the washer 10 is defective (S1050).

The server may input the data received from the washer 10 into the input layers of the first ANN model 1111 and the second ANN model 1112. The first ANN model 1111 may output an output value related to the condition of the washer 10, and the second ANN model 1112 may compare the input data with reconstructed data to thereby determine whether the input data is learned data.

The server may transmit the result of inspection of the condition of the washer 10 to the washer 10 (S1060).

Upon receiving the result of inspection of the condition of the washer 10 from the server, the washer 10 may display the condition information for the washer 10 via the display 450 and/or the speaker.

The above-described embodiments of the present disclosure may be implemented in code that a computer may read out of a recording medium. The computer-readable recording medium includes all types of recording devices storing data readable by a computer system. Examples of the computer-readable recording medium include hard disk drives (HDDs), solid state disks (SSDs), silicon disk drives (SDDs), read-only memories (ROMs), random access memories (RAMs), CD-ROMs, magnetic tapes, floppy disks, or optical data storage devices, or carrier wave-type implementations (e.g., transmissions over the Internet). Thus, the above description should be interpreted not as limiting in all aspects but as exemplary. The scope of the present disclosure should be determined by reasonable interpretations of the appended claims and all equivalents of the present disclosure belong to the scope of the present disclosure.

What is claimed is:

1. A method for inspecting defects in a washer based on deep learning, the method comprising:
   gathering data related to an operation of the washer via a data collector while the washer operates;
   determining learning data based on the gathered data related to the operation of the washer;
   training a first artificial neural network (ANN) model, with the learning data and washer condition data set as input data and output data, respectively;
   training a second ANN model, with the learning data set as input data and output data;
   generating a condition inspection model of the washer by combining the trained first ANN and second ANN; and
   inspecting whether the washer is defective based on the condition inspection model of the washer,
   wherein the learning data includes at least one of an rRPM, a cRPM, an Iq, a UB, gyro three-axis data, and acceleration three-axis data, and
   wherein the washer condition data includes at least one of normal, broken, worn-out, or misinstalled.

2. The method of claim 1, wherein gathering the data related to the operation of the washer includes gathering learning data corresponding to each condition including at least one of normal, broken, worn-out, or misinstalled and a laundry level based on the condition of the washer and the laundry level.

3. The method of claim 1, wherein gathering the data related to the operation of the washer is performed during a period of at least 60 msec or more.

4. The method of claim 1, wherein the second ANN model is an autoencoder.

5. The method of claim 1, wherein inspecting whether the washer is defective includes:
   determining data under inspection based on the gathered data related to the operation of the washer;
   inputting the data under inspection, as the input data, to the second ANN model based on that the number of pieces of the data under inspection is a preset threshold or more; and
   calculating a mean square error (MSE) by comparing the input data and output data of the second ANN model, wherein determination regarding the inspection of the condition of the washer is put on hold based on that the MSE is a preset threshold or more.

6. The method of claim 5, further comprising:
   based on that the MSE is less than the preset threshold, inputting the data under inspection as the input data of the first ANN model; and
   determining the condition of the washer based on the output data of the first ANN model.

7. The method of claim 5, further comprising:
   based on that the MSE is the preset threshold or more, regathering the data related to the operation of the washer via the data collector while the washer operates;
   redetermining the data under inspection based on the regathered data; and
   reinspecting whether the washer is defective based on the condition inspection model of the washer.

8. The method of claim 6, further comprising:
   based on that the condition of the washer is determined to be normal,
   regathering the data related to the operation of the washer via the data collector while the washer operates;
   determining the data under inspection based on the regathered data related to the operation of the washer; and
   reinspecting whether the washer is defective based on the condition inspection model of the washer.

9. The method of claim 1, further comprising:
   inputting assessment data to the condition inspection model of the washer; and
   retraining the condition inspection model based on that data output from the condition inspection model of the washer, with the assessment data set as input data, fails to meet a preset reference.

10. The method of claim 9, wherein retraining the condition inspection model includes assessing the output data as failing to meet the preset reference based on that the number or proportion of pieces of the assessment data for which a result of analysis of the output data is incorrect exceeds a preset threshold.

11. A method for inspecting defects in a washer based on deep learning, the method comprising:
    receiving data related to an operation of the washer, gathered via a data collector while the washer operates;
    determining learning data based on the received data related to the operation of the washer;
    training a first artificial neural network (ANN) model, with the learning data and washer condition data set as input data and output data, respectively;

training a second ANN model, with the learning data set as input data and output data;

generating a condition inspection model of the washer by combining the trained first ANN and second ANN;

inspecting whether the washer is defective based on the condition inspection model of the washer; and transmitting a condition inspection result of the washer to the washer, wherein the learning data includes at least one of an rRPM, a cRPM, an Iq, a UB, gyro three-axis data, and acceleration three-axis data, and wherein the washer condition data includes at least one of normal, broken, worn-out, or misinstalled.

12. The method of claim 11, wherein inspecting whether the washer is defective based on the condition inspection model of the washer includes:

determining data under inspection based on the received data related to the operation of the washer;

inputting the data under inspection, as the input data, to the second ANN model based on that the number of pieces of the data under inspection is a preset threshold or more; and comparing the input data and output data of the second ANN model to calculate an MSE, wherein based on that the MSE is a preset threshold or more, determination regarding the inspection of the condition of the washer is put on hold.

13. The method of claim 12, further comprising:

based on that the MSE is less than the preset threshold, inputting the data under inspection as the input data of the first ANN model; and determining the condition of the washer based on the output data of the first ANN model.

14. The method of claim 13, further comprising:

based on that the condition of the washer is determined to be normal, regathering the data related to the operation of the washer via the data collector while the washer operates;

determining the data under inspection based on the regathered data related to the operation of the washer; and reinspecting whether the washer is defective based on the condition inspection model of the washer.

15. A washer with a defect inspection model based on deep learning, the washer comprising:

a data collector;

a transceiver;

a memory; and an artificial intelligence (AI) processor, wherein the data collector gathers data related to an operation of the washer while the washer operates, wherein the AI processor determines learning data based on the gathered data related to the operation of the washer, trains a first artificial neural network (ANN) model, with the learning data and washer condition data set as input data and output data, respectively, trains a second ANN model, with the learning data set as input data and output data, generates a condition inspection model of the washer by combining the trained first ANN and second ANN, and inspects whether the washer is defective based on the condition inspection model of the washer, wherein the learning data includes at least one of an rRPM, a cRPM, an Iq, a UB, gyro three-axis data, and acceleration three-axis data, and wherein the washer condition data includes at least one of normal, broken, worn-out, or misinstalled.

16. The washer of claim 15, wherein the AI processor gathers learning data corresponding to each condition including at least one of normal, broken, worn-out, or misinstalled and a laundry level based on the condition of the washer and the laundry level.

17. The washer of claim 15, wherein the second ANN model is an autoencoder.

18. The washer of claim 15, wherein the AI processor inspects whether the washer is defective based on the condition inspection model of the washer, determines data under inspection based on the gathered data related to the operation of the washer, based on that the number of pieces of the data under inspection is a preset threshold or more, inputs the data under inspection, as the input data, to the second ANN model, and compares the input data and output data of the second ANN model to calculate an MSE, and based on that the MSE is a preset threshold or more, determination regarding the inspection of the condition of the washer is put on hold.

19. The washer of claim 18, wherein the AI processor, based on that the MSE is less than the preset threshold, inputs the data under inspection as the input data of the first ANN model and determines the condition of the washer based on the output data of the first ANN model.

20. An AI device with a defect inspection model based on deep learning, the AI device comprising:

a transceiver;

a memory; and an AI processor, wherein the transceiver receives data related to an operation of a washer, gathered via a data collector while the washer operates and transmits a condition inspection result to the washer, wherein the AI processor determines learning data based on the received data related to the operation of the washer, trains a first artificial neural network (ANN) model, with the learning data and washer condition data set as input data and output data, respectively, trains a second ANN model, with the learning data set as input data and output data, generates a condition inspection model of the washer by combining the trained first ANN and second ANN, and inspects whether the washer is defective based on the condition inspection model of the washer, wherein the learning data includes at least one of an rRPM, a cRPM, an Iq, a UB, gyro three-axis data, and acceleration three-axis data, and wherein the washer condition data includes at least one of normal, broken, worn-out, or misinstalled.

* * * * *